(12) United States Patent
Yoshioka et al.

(10) Patent No.: US 6,297,606 B1
(45) Date of Patent: Oct. 2, 2001

(54) SUNROOF CONTROLLING DEVICE

(75) Inventors: Nobuo Yoshioka; Hiroyuki Funaki; Kenichi Niki; Tokuhiro Tanaka, all of Yokohama (JP)

(73) Assignee: Jidosha Denki Kogyo Kabushiki Kaisha, Kanagawa-Prefrecture (JP)

( * ) Notice: Subject to any disclaimer, the term of this patent is extended or adjusted under 35 U.S.C. 154(b) by 0 days.

(21) Appl. No.: 09/572,936

(22) Filed: May 18, 2000

(30) Foreign Application Priority Data

May 18, 1999 (JP) ................................. 11-137561

(51) Int. Cl.[7] ........................................... H02P 7/00
(52) U.S. Cl. ..................... 318/467; 318/286; 318/293; 318/466; 318/468; 318/469
(58) Field of Search ........................ 318/467, 466, 318/468, 469, 286, 293

(56) References Cited

U.S. PATENT DOCUMENTS

| | | | |
|---|---|---|---|
| 4,608,637 | * 8/1986 | Okuyama et al. | 364/424 |
| 4,918,360 | * 4/1990 | Tanaka et al. | 318/41 |
| 5,773,947 | * 6/1998 | Torii et al | 318/466 |
| 5,793,173 | * 8/1998 | Henschel et al. | 318/467 |
| 6,194,857 | * 2/2001 | Stolz | 318/466 |

* cited by examiner

Primary Examiner—Robert E. Nappi
Assistant Examiner—Rita Leykin
(74) Attorney, Agent, or Firm—Sughrue, Mion, Zinn, Macpeak & Seas, PLLC

(57) ABSTRACT

A sunroof controlling device for controlling a sunroof lid in sliding and tilting directions without using a mechanical position switch, which comprises and actuator having an electric motor and an output shaft to be connected with the sunroof lid, a switch for generating a command signal, and a control unit including an armature shaft rotation signal generating means, an output shaft rotation signal generating means, and a counting means for counting the signals generated from the armature shaft rotation signal generating means and the output shaft rotation signal generating means, and the control unit starts current supply to the electric motor of the actuator in response to the command signal and interrupts the current supply according to the count value of the counting means.

5 Claims, 9 Drawing Sheets

SUNROOF CONTROLLING DEVICE

BACKGROUND OF THE INVENTION

1. Field of the Invention

This invention relates to a sunroof controlling device used for driving a sunroof lid of the motor vehicle.

2. Description of the Prior Art A sunroof controlling device for driving the sunroof lid of the motor vehicle is disclosed in, for example, U.S. Pat. No. 5,823,905 or Laid-Open Japanese Utility Model (KOKAI) No. 60-129461/85.

In general, the stroke of the sunroof lid is equivalent to several times to over ten times as long as one revolution of the output shaft of the actuator to drive the sunroof lid, therefore a speed decreasing mechanism with a plurality of reduction gears and a switching mechanism are used in the position detection switch of the sunroof lid.

SUMMARY OF THE INVENTION

It is an object to provide a sunroof controlling device which is not provided with the position detecting switch composed of the speed decreasing mechanism having a plurality of the gears and the switching mechanism.

DESCRIPTION OF THE PREFERRED EMBODIMENT

An embodiment of the sunroof controlling device according to this invention will be explained below on basis of FIG. 1 to FIG. 9.

Figure 1:
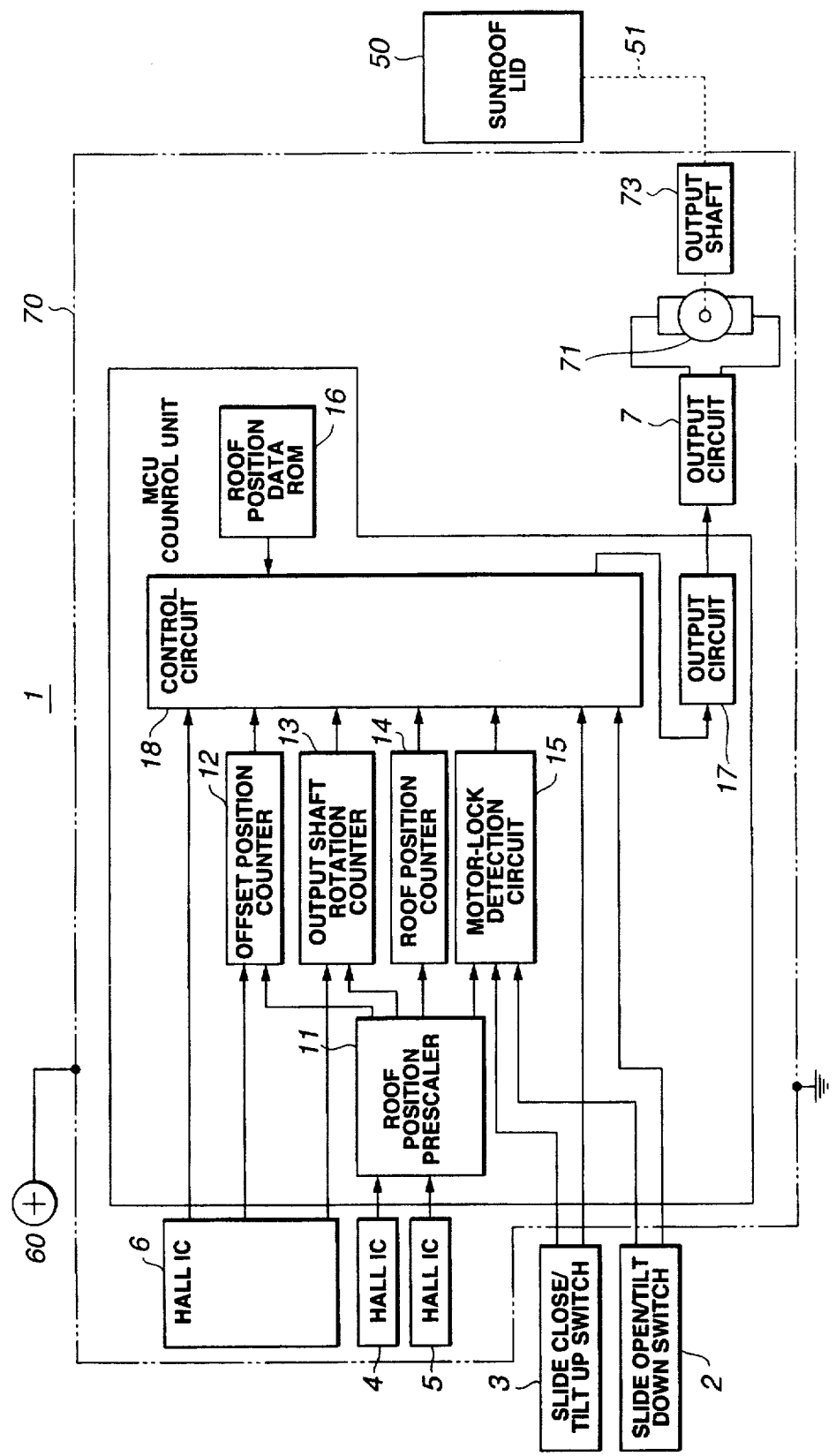
FIG. 1 is a block diagram of a sunroof controlling device according to an embodiment of this invention.

The sunroof controlling device shown in FIG. 1 is mainly composed of a slide open/tilt down switch 2, a slide close/tilt up switch 3 and actuator 70 housing an electric motor 71, and the actuator 70 is incorporated with a first armature shaft rotation signal generating means 4 (Hall IC), a second armature shaft rotation signal generating means 5 (Hall IC), an output shaft rotation signal generating means 6 (Hall IC), an output circuit 7, and a control unit MCU (microprogram control unit). The control unit MCU houses a roof position prescaler 11, an offset position counter 12, an output shaft rotation counter 13, a roof position counter 14, a motor-lock detection circuit 15, a roof position data ROM 16; an output circuit 17 and a control circuit 18.

Figure 4:
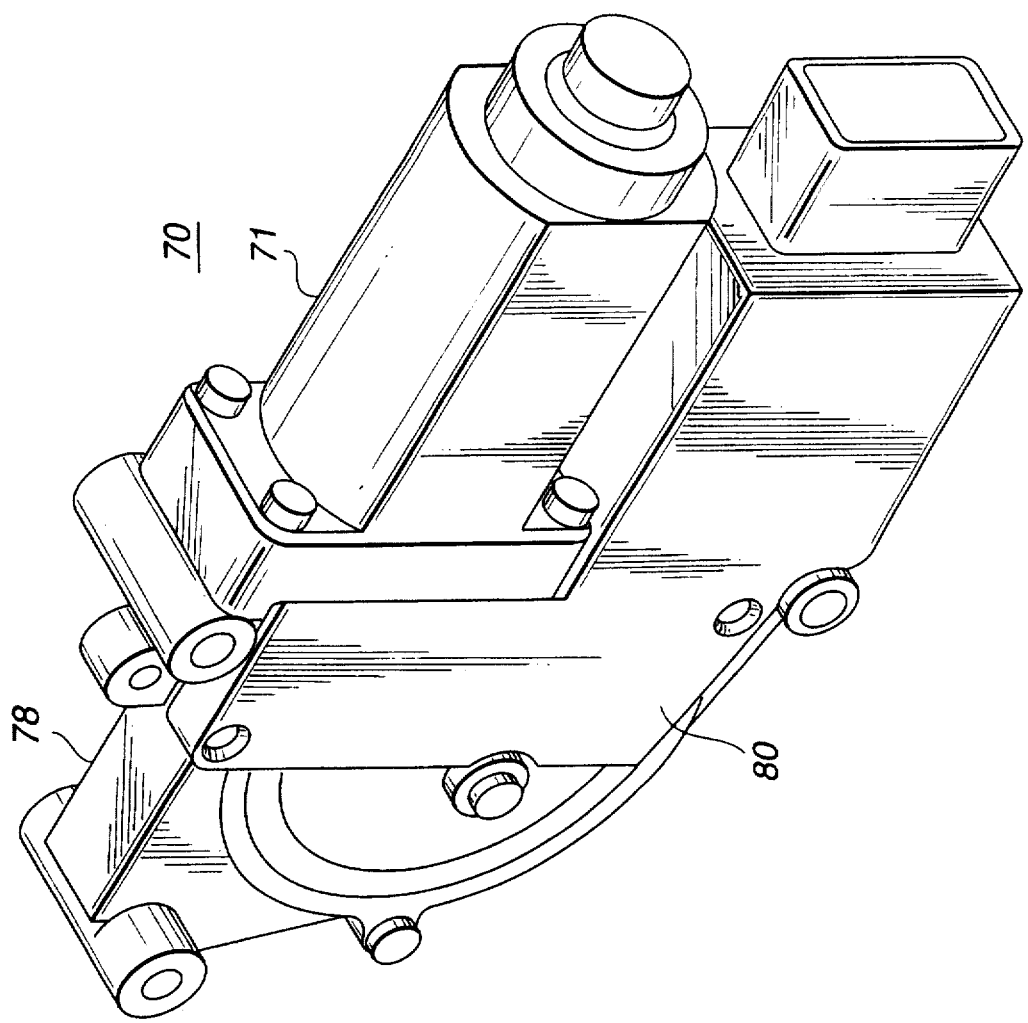
FIG. 4 is a perspective view of an actuator used in the sunroof controlling device shown in FIG. 1.
Figure 5:
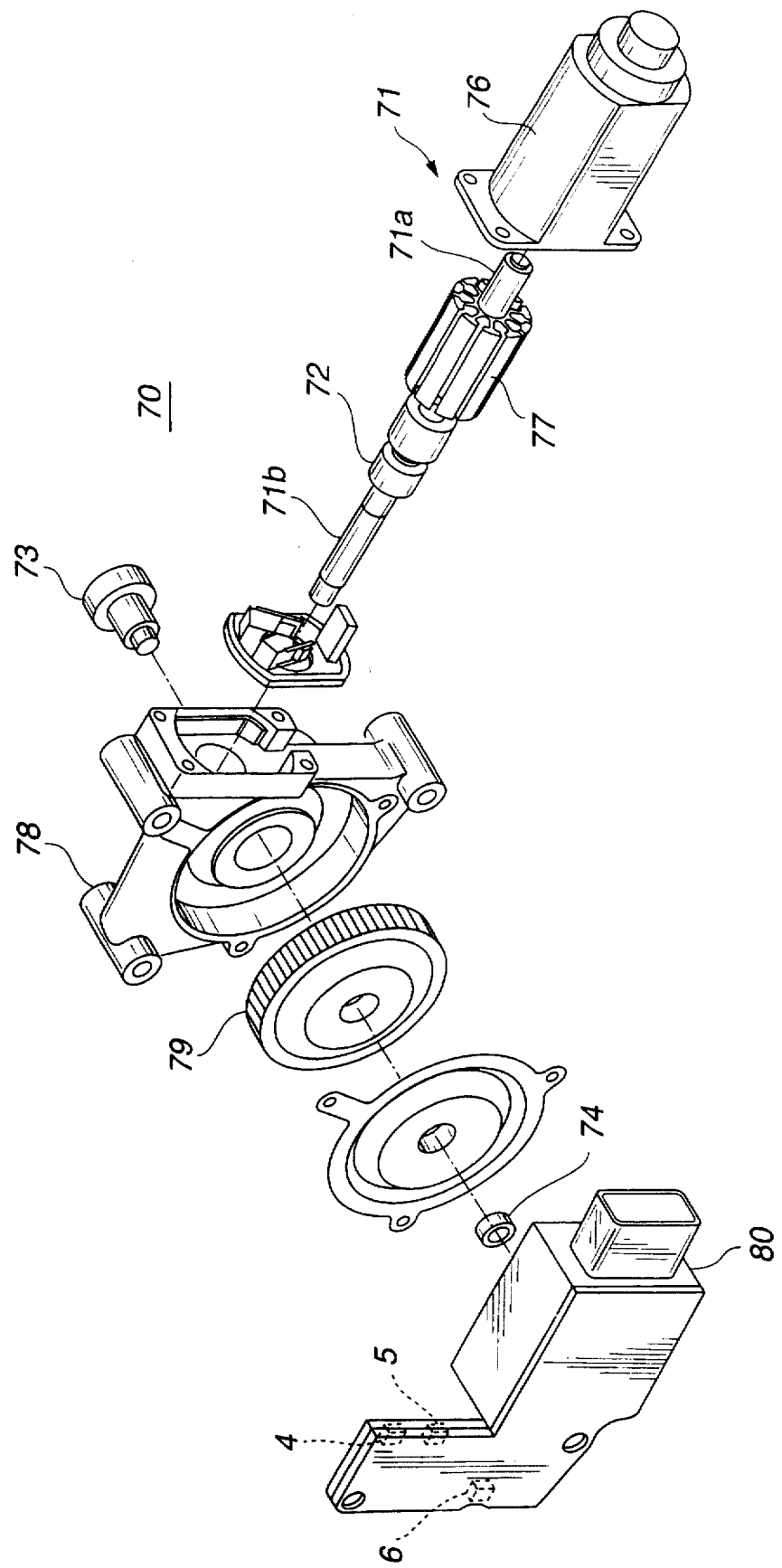
FIG. 5 is an exploded perspective view illustrating the construction of parts of the actuator shown in FIG. 4.

The electric motor 71 of the actuator 70 has an armature 77 housed in a motor yoke 76 as shown in FIG. 4 and FIG. 5, the armature 77 is provided with an armature shaft 71a, a worm 71b formed on the armature shaft 71a is protrudingly disposed in a gear case 78 screwed with the motor yoke 76 and meshed with a worm wheel 79 in the gear case 78. The worm wheel 79 is provided with an output shaft 73 supported rotatably by the gear case 78.

The gear case 78 is disposed with a circuit box 80, which contains the control unit MCU, the Hall IC 4, the Hall IC 5, the Hall IC 6 and the output circuit 7.

The output shaft 73 of the actuator 70 are operatively connected with a sunroof lid 50 through a lid driving mechanism 51.

The slide open/tilt down switch 2 generates a command signal to drive the sunroof lid 50 in a slid open or a tilt down direction according to on-operation thereof.

The slide open-tilt down signal generated by the slide open/tilt down switch 2 is supplied to the control circuit 18 and the motor-lock detection circuit 15.

The slide close/tilt up switch 3 generates a command signal to drive the sunroof lid 50 in a slide close or a tilt up direction according to on-operation thereof.

The slide close-tilt up signal generated by the slide close/tilt up switch 3 is supplied to the control circuit 18 and the motor-lock detection circuit 15.

Figure 6:
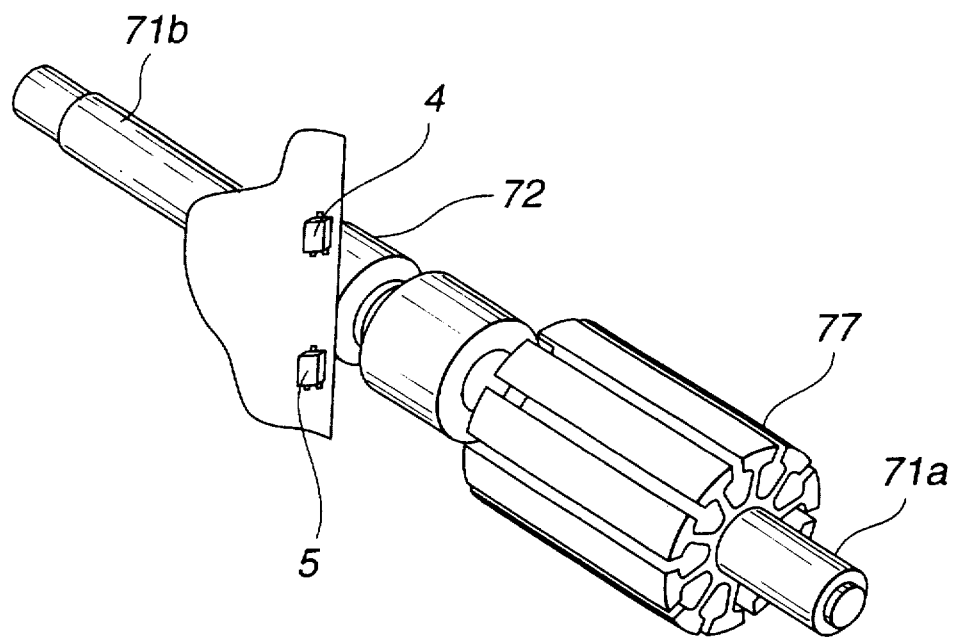
FIG. 6 is a perspective view illustrating relative positions of the armature shaft and the first and second rotation signal generating means in the actuator shown in FIG. 4.

The Hall IC 4 is disposed in the peripheral region of a magnet 72 secured to the armature shaft 71a provided in the electric motor 71 of the actuator 70 so as not be out of contact with the magnet 72 as shown in FIG. 5 and FIG. 6.

The Hall IC 4 generates a pulse-shaped first armature shaft rotation signal owing to magnetic flux given from the magnet 72 in accordance with the rotation of the armature shaft 71a. The first armature shaft rotation signal generated by the Hall IC 4 is given to the roof position prescaler 11.

The Hall IC 5 is a Hall IC similar to the Hall IC 4 and is disposed in the peripheral region of the magnet 72 secured to the armature shaft 71a provided in the electric motor 71 of the actuator 70 without touching the magnet 72 as shown in FIG. 5 and FIG. 6. The Hall IC 5 is disposed at a position displaced in the circumferential direction of the armature shaft 71a as much as approximately 90 degrees against the Hall IC 4.

The Hall IC 5 generates a pulse-shaped second armature shaft rotation signal with phase difference of 90 degrees from the first armature shaft rotation signal of the Hall IC 4 owing to magnetic flux given from the magnet 72 in accordance with the rotation of the armature shaft 71a. The second armature shaft rotation signal generated by the Hall IC 5 is given to the roof position prescaler 11.

Figure 7:
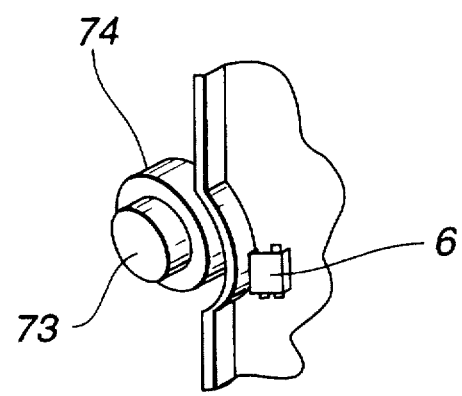
FIG. 7 is a perspective view illustrating relative positions of the output shaft and the output shaft rotation signal generating means in the actuator shown in FIG. 4.

The Hall IC 6 is disposed in the peripheral region of a magnet 74 secured to the output shaft 73 provided in the actuator 70 without touching the magnet 74 as shown in FIG. 5 and FIG. 7. The output shaft 73 of the actuator 70 is connected to the armature shaft 71a through the worm 71b and the worm wheel 79, whereby the rotational speed of the output shaft 73 is reduced against that of the armature shaft 71a.

The Hall IC 6 generates a pulse-shaped output shaft rotation signal owing to magnetic flux given from the magnet 74 in accordance with the rotation of the output shaft 73. The output shaft rotation signal generated by the Hall IC 6 is given to the control circuit 18, the offset position counter 12 and the output shaft rotation counter 13, respectively.

The roof position prescaler 11 counts the first armature shaft rotation signal generated by the Hall IC 4 and the second armature shaft rotation signal generated by the Hall IC 5 every one-fourth rotation of the armature shaft 71a on basis of the edge signals in the respective signals, and executes increment of the count value according to forward rotation of the armature shaft 71a and executes decrement of the count value according to the reverse rotation of the armature shaft 71a. The count data counted by the roof position prescaler 11 are given to the offset position counter 12, the output shaft rotation counter 13, the roof position counter 14 and the motor-lock detection circuit 15, respectively.

The offset position counter 12 is a counter for counting the first and second armature shaft rotation signals generated by the Hall IC 4 and 5 after the positive going edge appears in the output shaft rotation signal generated by the Hall IC 6. The count data of the offset position counter 12 are given to the control circuit 18. The offset position counter 12 is described as [OFFSET CT] in the flowchart.

The roof position counter 14 is a counter for memorizing the position of the sunroof lid 50, given with the count data counted at the roof position prescaler 11 and executes increment or decrement of the count value in accordance with the moving direction of the sunroof lid 50. The count data of the roof position counter 14 is given to the control circuit 18. The roof position counter 14 is described in the flowchart as [GPC].

The motor-lock detection circuit 15 detects the armature shaft 71a of the electric motor 71 to be locked according to the situation of input of the count data given from the roof position prescaler 11, and the slide open-tilt down signal or the slide close-tilt up signal given from the slide open/tilt down switch 2 or the slide close/tilt up switch 3.

The roof position data ROM 16 is stored with full-closed position data CLOSE to be compared with the count value of the roof position counter 14, full-opened position data OPEN, full-tilting position data TILTUP, data na to be compared with the count value of the offset position counter 12 and data Na to be compared with the count value of the output shaft rotation counter 13.

The drive circuit 17 supplies drive signals to rotate the electric motor 71 in the forward or reverse direction by receiving the output signals from the control circuit 18.

The control circuit 18 controls performance in the system entirely, the control circuit 18 controls stopping, forward-rotation and reverse rotation of the electric motor 71 among the full-opened position OPEN, the full-closed position CLOSE and the full-tilting position TILTUP of the sunroof lid 50 on referring to the roof position data given from the roof position counter 14.

The output circuit 7 includes relays or transistors, supplies an electric current in the forward rotational direction or the reverse rotational direction to the electric motor 71 and interrupts the current supply to the motor 71 in response to the command signal given from the drive circuit 17.

In the actuator 70, initial setting of stopping position of the output shaft 73 is carried out in the independent state before the actuator 70 is incorporated into the lid drive mechanism 51. First of all, the slide open/tilt down switch 2 is switched on, thereby rotating the armature shaft 71a of the electric motor 71 in the forward direction. The offset position counter 12 is reset by the positive going edge in the output shaft rotation signal generated from the Hall IC 6 according to the forward rotation of the armature shaft 71a, and the rotation of the electric motor 71 is interrupted at the time when the offset position counter 12 counts the first and second armature rotation signals generated by the Hall IC 4 and 5 as many as number "na" after that. This stopping position of the armature shaft 71a is determined in correspondence to the full-closed position of the sunroof lid 50 in advance. In this manner, the initial setting of the stopping position of the output shaft 73 is completed.

After the initial setting of the stopping position of the output shaft 73 is finished in the separate state of the actuator 70, the output shaft 73 of the actuator 70 is incorporated into the lid drive mechanism 51.

When the slide open/tilt down switch 2 is switched on in a state where the sunroof lid 50 is tilted down, the output shaft 73 of the actuator 70 is rotated in the forward direction, thereby driving the sunroof lid 50 in the slide-opening direction.

If the slide close/tilt up switch 3 is switched on in a state where the sunroof lid 50 is opened, the output shaft 73 of the actuator 70 is rotated in the reverse direction, thereby driving the sunroof lid 50 in the closing direction.

When the slide close/tilt up switch 3 is switched on in a state where the sunroof lid 50 is tilted down at the full-closed position, the output shaft 73 of the actuator 70 is rotated in the reverse direction, thereby tilting up the sunroof lid 50.

If the slide open/tilt down switch 2 is switched on in a state where the sunroof lid 50 is tilted up, the output shaft 73 of the actuator is rotated in the forward direction, thereby tilting down the sunroof lid 50.

Figure 8:
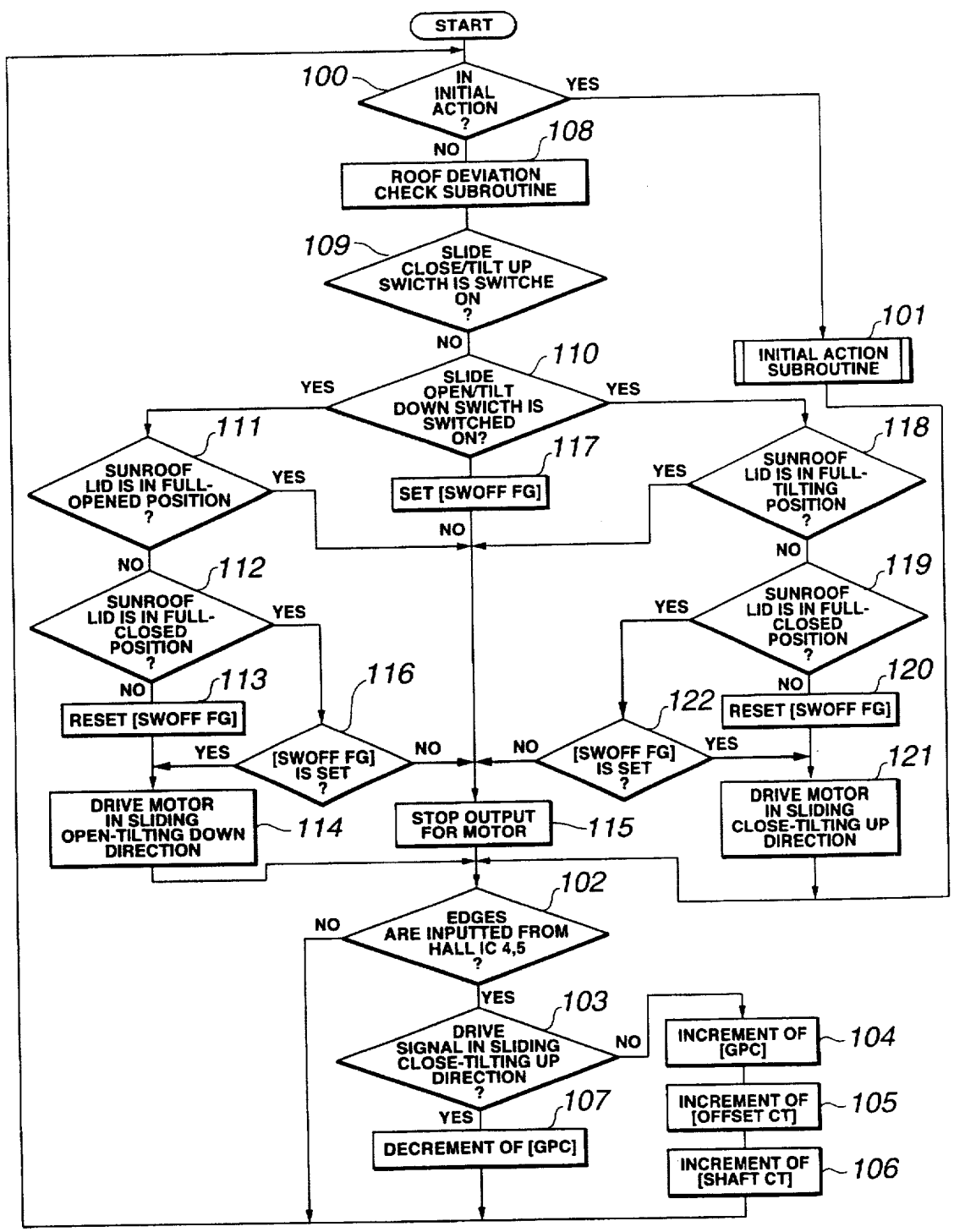
FIG. 8 is a flowchart illustrating the mainroutine of the control in the sunroof controlling device shown in FIG. 1.
Figure 9A:
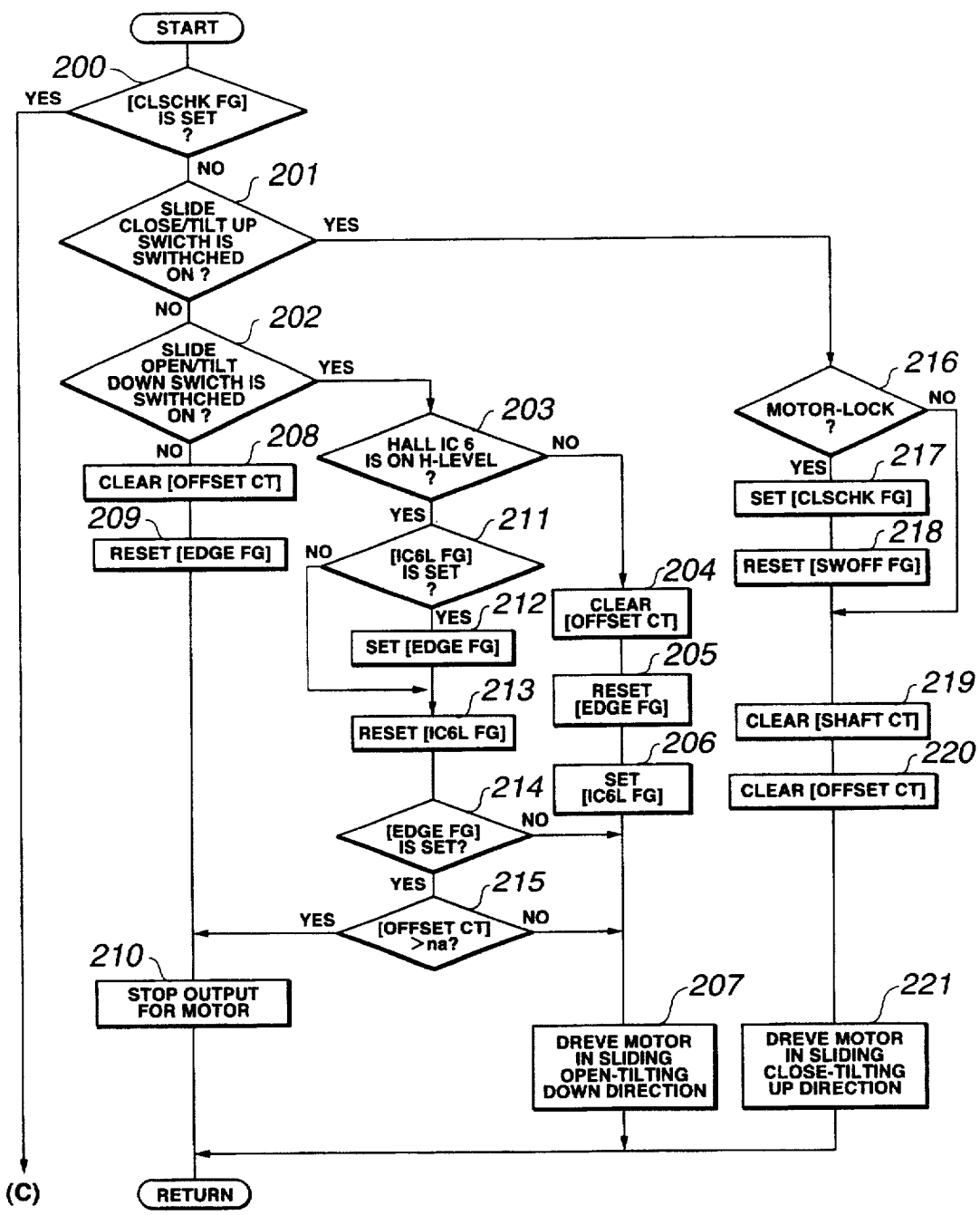
FIG. 9 is a flowchart illustrating the subroutine of the control in the sunroof controlling device shown in FIG. 1.
Figure 9B:
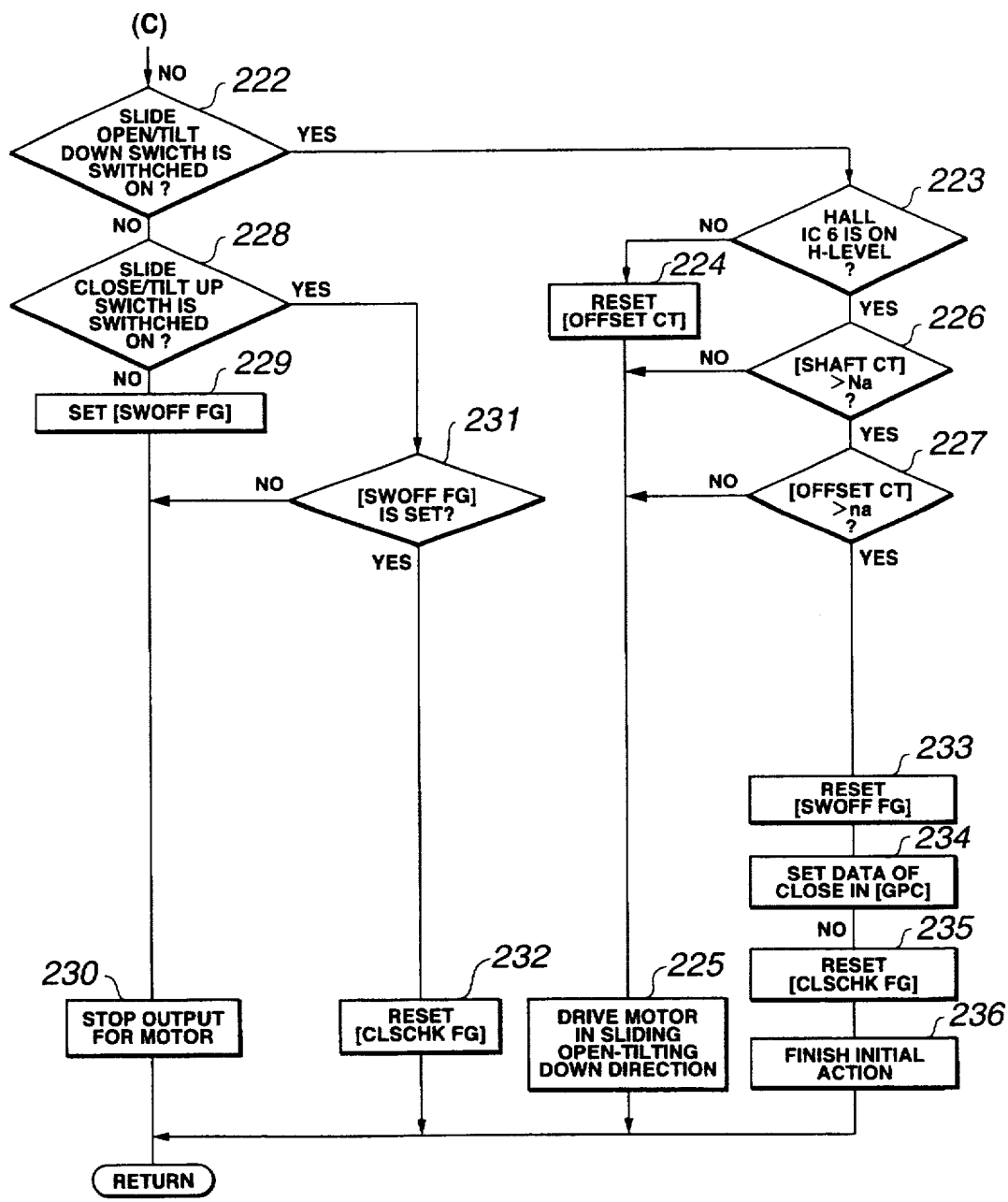

The sunroof controlling device 1 having the aforementioned structure controls movements of the sunroof lid 50 by executing the mainroutine for ordinary action shown in FIG. 8 and the subroutine of the initial mode shown in FIG. 9.

In the mainroutine for the ordinary action, the actuator 70 is controlled on basis of the input signal from the slide open/tilt down switch 2 or the slide close/tilt up switch 3, whereby the movement of the sunroof lid 50 is interrupted automatically at the time the sunroof lid 50 arrives at the full-opened position, the full-closed position and the tilt up position. Namely, the rotation of the output shaft 73 of the actuator 70 is suspended when the count value of the roof position counter 14 is in agreement with the full-opened position data OPEN, the full-closed position data CLOSE or the full-tilting position data TILTUP stored in the roof position data ROM 16.

The subroutine in the initial mode is used for setting the initial position of the output shaft 73 in the independent state and further used for resetting the roof position counter 14 in a case where an error appears in the count value of the roof position counter 14 against the actual position of the sunroof lid 50 as the result of moving the sunroof lid 50 by manual operation, for example.

An explanation will be given below about the initial action of the actuator 70 in the dependent state, that is details for setting the initial position of the output shaft 73, on basis of the flowchart.

Figure 2:
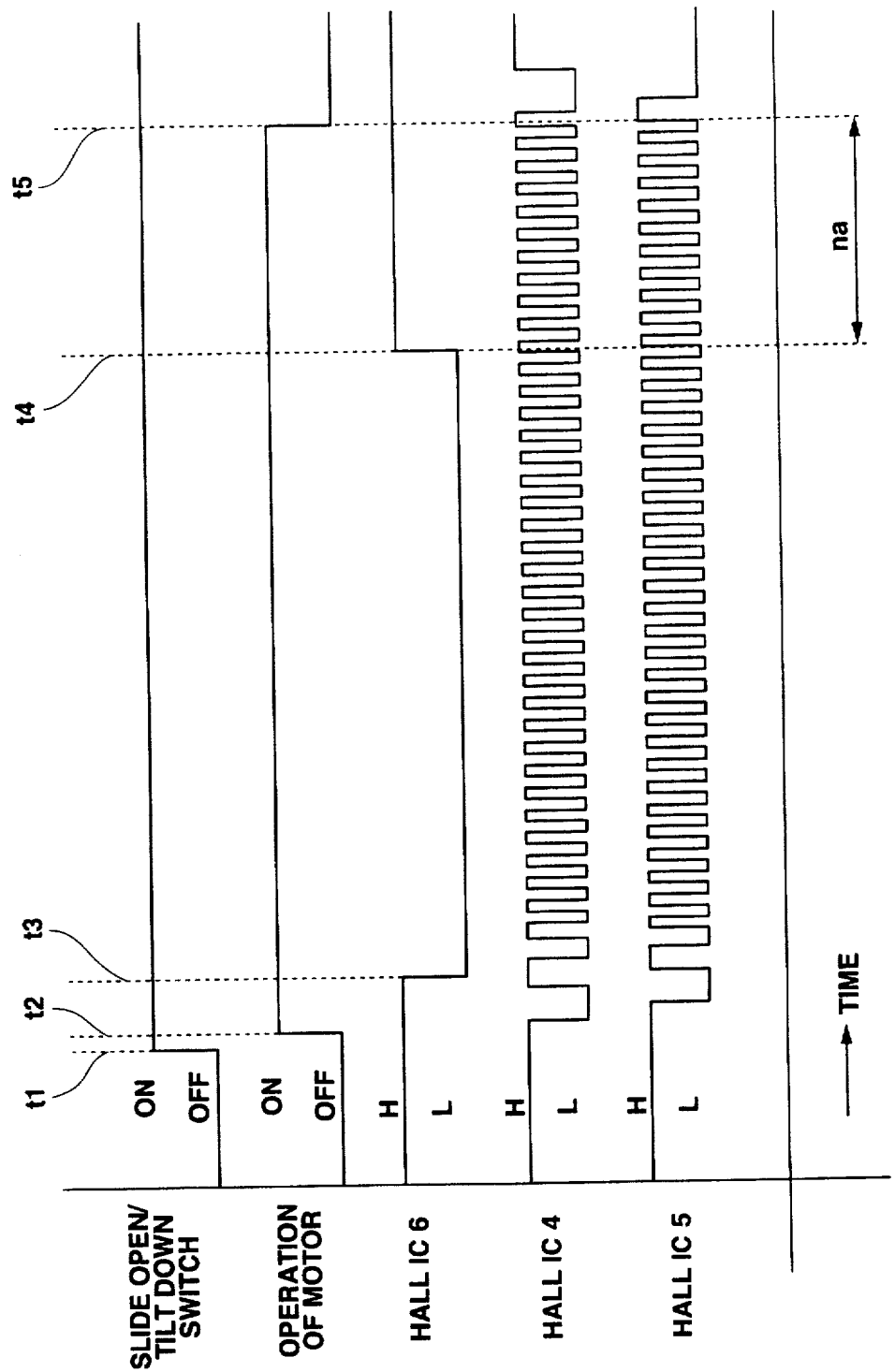
FIGS. 2 and 3 are time charts illustrating the control in the sunroof controlling device shown in FIG. 1.

When the slide open/tilt down switch 2 is set at the on-state at time t1 shown in FIG. 2, determination is done to be "in the initial action (YES)" at step 100 in the mainroutine shown in FIG.8, and the control proceeds to step 200 in the subroutine shown in FIG. 9 by executing "go to the initial action subroutine" at step 101.

At the step 200 shown in FIG. 9, determination is done as to whether a full-closed position recognition flag [CLSCHK FG] is set or not, and the control proceeds to step 201 because the flag is not set (NO). At the step 201, determination is done that "the slide close/tilt up switch 3 is not switched on (NO)" and control proceeds to step 203 after determining that "the slide open/tilt down switch 2 is switched on (YES) at step 202.

The output shaft rotation signal of the Hall IC 6 previously becomes to the high level (H) by chance at time t1 in FIG. 2, therefore determination is done at the step 203 that "the output shaft rotation signal of the Hall IC 6 is on the high level (H)" and the control proceeds to step 211.

At the step 211, determination is done as to whether a level check flag [IC6L FG] is set or not, the control proceeds to step 213 after determining the flag not to be set (NO) at the step 211, and further proceeds to step 214 after "resetting the level check flag [IC6L FG]" at the step 213. The level check flag [IC6L FG] is set when the output shaft rotation signal of the Hall IC 6 becomes to the low level (L).

Determination is done at the step 214 as to whether an edge check flag [EDGE FG] is set or not, the control proceeds to step 207 since the flag is not set (NO). The edge check flag [EDGE FG] is set at the time when the output shaft rotation signal of the Hall IC 6 becomes to the high level (H) from the low level (L), and used for confirming the positive going edge in the output shaft rotation signal. In this time, there is a case where the output shaft rotation signal of the Hall IC 6 already becomes to the high level (H) immediately after the beginning of power supply, therefore, the edge check flag [EDGE FG] is set by the positive going edge of the output shaft rotation signal after confirming the output shaft rotation signal to get once into the low level (L).

At the step 207, "to drive the electric motor 71 in the sliding open-tilting down direction" is executed, and then the control returns to the step 200.

At time t2 shown in FIG. 2, the armature shaft 71a of the electric motor 71 is rotated in the forward direction, whereby the Hall IC 4 and 5 generate the first and second armature shaft rotation signals. Furthermore, the Hall IC 6 generates the output shaft rotation signal on basis of the forward rotation of the output shaft 73, the first and second armature shaft rotation signals are supplied to the roof position prescaler 11, respectively and the output shaft rotation signal is supplied into the offset position counter 12 and the output shaft rotation counter 13, respectively.

Furthermore, the armature shaft 71a of the electric motor 71 continues to be rotated in the forward direction by executing steps 200, 201, 202, 203, 211, 213 214 and 207 repeatedly.

The armature shaft 71a of the electric motor 71 continues the forward rotation and the output shaft rotation signal generated by the Hall IC 6 becomes to the low level (L) at time t3 in FIG. 2. Accordingly, determination is done at the step 203 that "the output shaft rotation signal generated by the Hall IC 6 is not the high level (H)" and the control proceeds to step 204.

"To clear the offset position counter 12" is executed at the step 204, "to reset the edge check flag [EDGE FG] is executed at step 205, "to set the level check flag [IC6L FG]" is executed at step 206, and then the control proceeds to the step 207. The steps 200, 201, 202, 203, 204, 205, 206 and 207 are executed repeatedly so long as the output shaft rotation signal generated by the Hall IC 6 is on the low level (L), therefore the armature shaft 71a of the motor 71 is successively rotated in the forward direction.

When the output shaft rotation signal generated by the Hall IC 6 becomes to the high level (H) at time t4 shown in FIG.2, determination is done at the step 203 that "the output shaft rotation signal generated by the Hall IC 6 is on the high level (H)" and the control proceeds to the step 211 again.

At the step 211, determination is done that "the level check flag [IC6L FG] is set", therefore "to set the edge check flag [EDGE FG]" is executed at step 212, "to reset the level check flag [IC6L FG]" is executed at step 213, and the control proceeds to the step 214.

It is determined at the step 214 that "the edge check flag (EDGE FG) is set", and the control proceeds to step 215.

Determination is done at the step 215 as to whether the offset position counter 12 counts pulses of number "na" or not, so that the armature shaft 71a of the electric motor 71 is successively rotated in the forward direction until the offset position counter 12 finishes to count the pulses of number "na".

When the offset position counter 12 completes the count of the pulses of number "na" at time t5 in FIG.2, the control proceeds to step 210 from the step 215, and "to stop the output for the electric motor" is executed at the step 210. Whereby, the current supply to the electric motor 71 is interrupted and the armature shaft 71a stops to rotate.

In this manner, the armature shaft 71a and the output shaft 73 are rotated by switching on the slide open/tilt down switch 2 before the actuator 70 is mounted to the vehicle body, and the position of the output shaft 73 is defined as the initial position of the output shaft 73 at the time when the offset position counter 12 completes the count of the pulses of number "na" after the time t4 and the output shaft 73 is stopped. Additionally, the count value of the roof position counter 14 is set to the count value at the full-closed position of the sunroof lid 50 when the offset position counter 12 finishes to count the pulses of number "na".

After the setting of the initial position of the output shaft 73 is completed in the independent state of the actuator 70, the actuator 70 is mounted to the vehicle body and the output shaft 73 is connected to the lid drive mechanism 51. At if this time, the sunroof lid 50 is set up at the full-closed position, therefore the full-closed position of the sunroof lid 50 correctly corresponds to the count value of the roof position counter 14.

The sunroof controlling device 1 will be further explained below concerning ordinary action of the sunroof lid 50.

During the ordinary action, if the switches 2 and 3 are in off-state, determination is done to be "not in the initial action (NO)" at the step 100 in the mainroutine shown in FIG.8, the control proceeds to step 108 and further to step 109 after executing "roof deviation checking subroutine at the step 108. A detailed explanation of the step 108 is abbreviated.

When determination is done that "the slide close/tilt up switch 3 is not switched on" at the step 109 and it is determined that "the slide open/tilt down switch 2 is not switched on" at step 110, the control proceeds to step 117 and step 115, "to set switch-off flag [SWOFF FG]" is executed at the step 117, and then "to stop the output for the electric motor" is executed at the step 115. The control returns to the step 100 after determining as to whether edges of the first and second rotation signals are inputted or not.

When the slide open/tilt down switch 2 is switched on in the state the sunroof lid 50 is at the full-closed position, determination is done to be "not in the initial action" at the step 100 and the control proceeds to the step 109 after executing the step 108.

It is determined at the step 109 that "the slide close/tilt up switch 3 is not switched on (NO)", determined at the step 110 that "the slide open/tilt down switch 2 is switched on (YES)", determined at step 111 that "the sunroof lid 50 is not at the full-opened position (NO)" and the control proceeds to step 112. It is recognized on basis of the count value of the roof position counter 14 as to whether the sunroof lid 50 arrives to the full-opened position or not.

Determination is done to be "in the full-closed position (YES)" at the step 112, it is determined at step 116 that "the switch-off flag [SWOFF FG] is set (YES)" and then the control proceeds to the step 102 after executing "to drive the electric motor 71 in the sliding open-tilting down direction" at step 114.

The sunroof lid 50 is opened and the first and second rotation signal generating means 4 and 5 generate the first and second rotation signals according to the forward rotation of the armature shaft 71a of the electric motor 71 and the rotation signal generating means 6 generates the output shaft rotation signal according to the forward rotation of the output shaft 73. The respective first and second rotation signals are supplied to the roof position prescaler 11 and the output shaft rotation signal is supplied to the control circuit 18, the offset position counter 12 and the output shaft rotation counter 13, respectively.

If it is determined at the step 102 that "edges of the first and second rotation signals are not inputted", the control returns to the step 100 and the steps 108, 109, 110, 111, 112, 113, 114 and 102 are executed repeatedly. The control proceeds to step 103 when it is determined at the step 102 that "edges of the first and second rotation signals are inputted."

After determining that "drive signal is not in the sliding close-tilting up direction" at the step 103, "increment of the roof position counter (GPC) 14" is executed at step 104, "increment of the offset position counter (OFFSET CT) 12" is executed at step 105, "increment of the output shaft rotation counter (SHAFT CT) 13" is further executed at step 106, and then the control returns to the step 100. The respective increment of the counters 12, 13 and 14 are done in accordance with the edge signals in the inputted signals.

The armature shaft 71a of the electric motor 71 continues the forward rotation, thereby repeating the steps 100, 108, 109, 110, 111, 112, 113, 114, 102, 103, 104, 105 and 106, and making the increment of the roof position counter 14, the offset position counter 12 and the output shaft rotation counter 14 one by one.

If the slide open/tilt down switch 2 is switched off while the sunroof lid 50 is being driven on the opening side, the control proceeds to the step 117 from the step 110. Accordingly, "to set the switch-off flag [SWOFF FG]" is executed at the step 117, "to stop the output for the electric motor" is executed at the step 115 and the control proceeds to the step 102.

The rotation of the armature shaft 71a of the electric motor 71 is stopped and the sunroof lid 50 is halted at a position between the full-closed and full opened positions.

When the slid open/tilt down switch 2 is switched on again in a case where the sunroof lid 50 is in the position between the full-closed and full-opened positions, the steps 100, 108, 109 and 110 are executed. After executing the steps 111 and 112, "to reset the switch-off flag [SWOFF FG]" is further executed at the step 113. The control proceeds to the step 102 after executing "to drive the electric motor 71 in the sliding open-tilting down direction" at the step 114.

The armature shaft 71a of the electric motor 71 is rotated in the forward direction, whereby the sunroof lid 50 is opened, the first and second rotation signals are respectively supplied into the roof position prescaler 11 again and the output shaft rotation signal is supplied into the control circuit 18, the offset position counter 12 and the output shaft rotation counter 13, respectively.

The control proceeds to the step 103 by determining that "edges of the first and second rotation signals generated from the first and second armature shaft rotation signal generating means 4 and 5 are inputted."

The control returns to the step 100 after executing the steps 103, 104, 105 and 106 again.

The processes of the steps 100, 108, 109, 110, 111, 112, 113, 114, 102, 103, 104, 105 and 106 is repeated by keeping the forward rotation of the armature shaft 71a of the electric motor 71, whereby the increment of the roof position counter 14, the offset position counter 12 and the output shaft rotation counter 13 is carried out one by one.

The sunroof lid 50 arrives in the full-opened position before long. The arrival of the sunroof lid 50 in the full-opened position is recognized according to the count value of the roof position counter 14.

The control proceeds to the step 115 from the step 111 because of the arrival of the sunroof lid 50 in the full-opened position, "to stop the output for the electric motor" is executed at the step 115. Consequently, the current supply is interrupted to the electric motor 71, thereby halting the rotation of the armature shaft 71a and stopping the sunroof lid at the full-opened position.

The control proceeds to the step 117 from the step 110 by switching off the slide open/tilt down switch 2 and "to set the switch-off flag (SWOFF FG)" is executed at the step 117.

When the slide close/tilt up switch 3 is switched on in the state where the sunroof lid 50 is in the full-opened position, it is determined at the step 109 that "the slide close/tilt up switch 3 is switched on (YES)", further determined at step 118 that "the sunroof lid 50 is not in the full-tilting position (NO)", and the control proceeds to step 119.

The control proceeds to step 120 after determining that "the sunroof lid 50 is not in the full-closed position" at the step 119, "to reset the switch-off flag [SWOFF FG]" is executed at the step 120, "to drive the electric motor in the sliding close-tilting up direction" is executed at step 121, and then the control proceeds to the step 102.

The sunroof lid 50 is closed and the first and second rotation signal generating means 4 and 5 generate the first and second rotation signals according to the reverse rotation of the armature shaft 71a of the electric motor 71 and the rotation signal generating means 6 generates the output shaft rotation signal according to the reverse rotation of the output shaft 73. The first and second rotation signals are respectively supplied to the roof position prescaler 11 and the output shaft rotation signal is supplied to the control circuit 18, the offset position counter 12 and the output shaft rotation counter 13, respectively.

The control returns to the step 100 by determining that "edges of the first and second rotation signals are not inputted (NO)" at the step 102, or proceeds to the step 103 by determining that "edges of the first and second rotation signals are inputted (YES)" at the step 102.

The control proceeds to step 107 after determining that "drive signal is in the sliding close-tilting up direction (YES)" at the step 103, and further returns to the step 100 after executing "decrement of the roof position counter [GPC] 14 at the step 107.

The sunroof lid 50 arrives in the full-closed position before long. At this time, the control proceeds to step 122 because determination is done at the step 119 that "the sunroof lid 50 is in the full-closed position", proceeds to the step 115 since "the switch-off flag [SWOFF FG] is not set" at the step 122, and further proceeds to the step 102 after executing "to stop the output for the electric motor" at the step 115, then the control returns to the step 100 from the step 102.

The armature shaft 71a of the electric motor 71 is halted to rotate in the reverse direction, thereby stopping the sunroof lid 50 at the full-closed position.

The control proceeds to the step 117 through the step 110 by switching off the slide close/tilt up switch 3 and "to set the switch-off flag [SWOFF FG]" is carried out.

If the slide close/tilt up switch 3 is switched on in the case where the sunroof lid 50 is stopped at the full-closed position, the control proceeds to the step 118 through determination at the step 109 that "the slide close/tilt up switch 3 is switched on (YES)", and further proceeds to the step 119 by determining that "the sunroof lid 50 is not in the full-tilting position" at the step 118.

After determining that "the sunroof lid 50 is in the full-closed position (YES)" at the step 119, determination is done at the step 122 that "the switch-off flag [SWOFF FG] is set", whereby the control proceeds to the step 118 and further proceeds to the step 102 after executing "to drive the electric motor in sliding close-tilting up direction" at he step 121.

According to the reverse rotation of the armature shaft 71a of the electric motor 71, the sunroof lid 50 in the full-closed position is driven in the tilting up direction, the first and second rotation signals are respectively supplied in the roof position prescaler 11 and the output shaft rotation signal is supplied to the respective control circuit 18, the offset position counter 12 and the output shaft rotation counter 13.

The control returns to the step 100 in a case where "edges of the first and second rotation signals are not inputted (NO)", or the control proceeds to the step 103 in another case where "the edges are inputted (YES)."

At the step 103, it is determined that "drive signal is in the sliding close-tilting up direction (YES)" and the control returns to the step 100 after executing "decrement of the roof position counter 14" at the step 107.

The sunroof lid 50 arrives in the full-tilting position after being driven in the tilting up direction before long. The arrival of the sunroof lid 50 in the full-tilting position is recognized in accordance with the count value of the roof position counter 14. The control proceeds to the step 115 through the step 118 because determination is done that "the sunroof lid 50 is in the full-tilting position" at the step 118, an the control returns to the step 100 through the step 102 after executing "to stop the output for the electric motor" at the step 115.

The armature shaft 71a of the electric motor 71 is halted c to rotate in the reverse direction, thereby stopping the sunroof lid 50 at the full-tilting position.

At the step 117 to which the control proceeds from the mi step 110 according to the off-operation of the slide close/tilt up switch 3, "to set the switch-off flag [SWOFF FG]" is executed.

When the slide open/tilt down switch 2 is switched on in the case where the sunroof lid 50 is in the full-tilting position, it is determined that "the slide open/tilt down switch 2 is switched on" at the step 110 to which the control; proceeds from the step 109, and the control proceeds to the step 112 after determination that "the sunroof lid 50 is not in the full-opened position" at the step 111.

The control proceeds to the step 113 because determination is done that "the sunroof lid 50 is not in the full-closed position" at the step 112, "to reset the switch-off flag [SWOFF FG]" is executed at the step 113, and the control proceeds to the step 102 after executing "to drive the electric motor 71 in the sliding open-tilting down direction at the step 114.

According to the forward rotation of the armature shaft 71a, the first and second rotation signals are respectively supplied to the roof position prescaler 11, and the output shaft rotation signal is supplied to the control circuit 18, the offset position counter 12 and the output shaft rotation counter 13, respectively.

The control proceeds to the step 103 when determination is done that "the first and second rotation signals generated from the rotation signal generating means 4 and 5 are inputted" at the step 102.

Subsequently, the steps 103, 104, 105 and 106 are executed and the control returns to the step 100.

The sunroof lid 50 arrives in the full-closed position after being driven in the tilting down direction before long. Accordingly, it is determined at the step 111 that "the sunroof lid 50 is not in the full-opened position", determined at the step 112 that "the sunroof lid 50 is in the full-closed position" and further determined at the step 116 that "the switch-off flag [SWOFF FG] is not set." The control proceeds to the step 102 and returns to the step 100 from the step 102 after executing "to stop the output for the electric motor" at the step 115.

The rotation of the armature shaft 71a of the electric motor 71 is halted, thereby the sunroof lid 50 is stopped at the full-closed position.

An explanation will be given below about a method for resetting the roof position counter 14. The resetting of the roof position counter 14 is carried out in the initial mode.

If the sunroof lid 50 is moved according to manual operation, the count value of the roof position counter 14 deviates from the actual position of the sunroof lid 50, thereby causing the error in the roof position counter 14.

Figure 3:
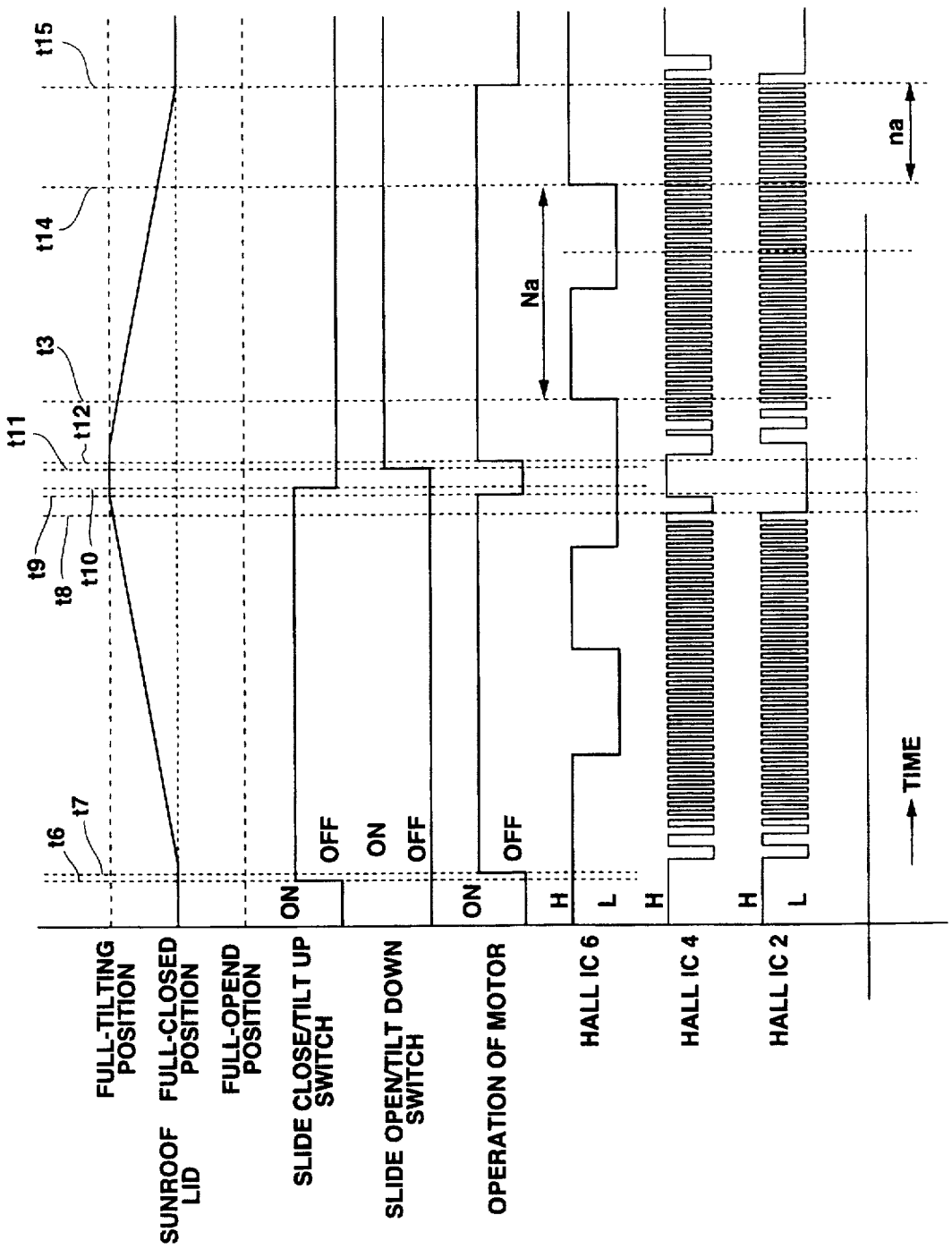

In the initial mode subroutine shown in FIG. 8, when the slide close/tilt up switch 3 is switched on at time t6 shown in FIG. 3, the control proceeds to step 216 by determining that "the slide close/tilt up switch 3 is switched on" at the step 201. The control further proceeds to step 219 by determining that "the electric motor is not locked" at the step 116.

"To clear, the output shaft rotation counter 13" is executed at the step 219, "to clear the offset position counter 12" is executed at step 220, and then the control proceeds to step 221.

At the step 221, "to drive the electric motor 71 in the sliding close-tilting up direction" is executed, and the control returns to the step 200. The electric motor 71 starts reverse rotation of the armature shaft 71a and the sunroof lid 50 begins to move in the tilting up direction at time t7 shown in FIG. 3.

While the sunroof lid 50 is driven in the tilting up direction, the steps 200, 201, 216, 219, 220 and 221 are repeatedly executed.

The sunroof lid 50 arrives at the full-tilting position after being driven in the tilting up direction before long at time t8. In this time, the current supply to the electric motor 71 is not interrupted because the count value of the roof position counter 14 deviates relatively from the actual position of the sunroof lid 50, and the output shaft 73 of the actuator 70 is locked owing to restraint of the rotation thereof at time t9. Accordingly, it is determined at the step 216 that "the motor-lock is caused" and the control proceeds to step 218 through step 217 after executing "to set the full-closed position recognition flag [CLSCHK FG]38 at the step 117. At the step 118, "to reset the switch-off flag [SWOFF FG]" is executed and the control returns to the step 200 after executing the steps 219, 220 and 221.

At the step 200, it is determined that "the full-closed position recognition flag (CLSCHK FG) is set" and the control proceeds to step 222 and further to step 228 since determination is done at the step 222 that "the slide open/tilt down switch 2 is not switched on."

It is determined at the step 228 that "the slide close/tilt up switch 3 is switched on" yet, therefore the control proceeds to step 231.

At the step 231, determination is done that "the switch-off flag [SWOFF FG] is not set" and then the control proceeds to step 230. The switch-off flag [SWOFF FG] is set when both the slide close/tilt up switch 3 and the slide open/tilt down switch 2 are in off-states, and used for recognizing disappearance of input signals from these switches.

It is executed to "stop the output for the electric motor" at the step 230 (at time t9), whereby the rotation of the armature shaft 71a is stopped by interrupting the current supply. The sunroof lid 50 is mechanically locked and stopped at the full-tilting position.

Subsequently, the slide close/tilt up switch 3 is switched off at time t10.

Next, it is determined at the step 200 that "the full-closed position recognition flag [CLSCHK FG] is set" and the control proceeds to the step 222 and further proceeds to the step 228 because determination is done at the step 222 that "the slide open/tilt down switch 2 is not switched on."

The control proceeds to step 229 since "the slide close/tilt up switch 3 is not switched on" at the step 228, and further to the step 230 after "setting the switch-off flag [SWOFF FG]" at the step 229.

The sunroof lid 50 is maintained in the stopping state at the full-tilting position because of executing "to stop the output for the electric motor" at the step 230.

At this time, if the slid close/tilt up switch 3 is switched on again, the control proceeds to the step 231 through the steps 200, 222, 228 and determination is done at the step 231 that "the switch-off flag [SWOFF FG] is set", therefore the control proceeds to step 232 and returns to the step 200 after resetting the full-closed position recognition flag [CLSCHK FG] at the step 232. Whereby the resetting of the roof position counter 14 is discontinued.

In a case where the slide open/tilt down switch 2 is switched on at time t11 after the sunroof lid 50 is mechanically locked and stopped in the full-tilting position, the control proceeds to the step 222 because it is determined that "the full-closed position recognition flag [CLSCHK FG] is set at the step 200 of the subroutine shown in FIG.9. At the step 222, it is determined that " the slide open/tilt down switch 2 is switched on (YES)" and the control proceeds to step 223.

In the step 223, the output shaft rotation signal generated from the Hall IC 6 is checked as to the signal level similarly to the aforementioned step 203.

If the output shaft rotation signal of the Hall IC 6 is on the low level (L), the control proceeds to step 224 from the step 223, "to reset the offset position counter 12" is executed at the step 224, and the control returns to the step 222 after executing "to drive the electric motor in the sliding open-tilting down direction" at step 225. When the output shaft rotation signal of the Hall IC 6 becomes to the high level (H), the control proceeds to the step 225 through step 226 or 227.

The armature shaft 71a of the electric motor 71 is rotated in the forward direction at time t12, whereby the Hall IC 4 and 5 generate the first and second rotation signals and the Hall IC 6 generates the output shaft rotation signal according to the forward rotation of the output shaft 73. The first and second rotation signals are respectively taken into the roof position prescaler 11 and the output shaft rotation signal is taken into the control circuit 18, the offset position counter 12 and the output shaft rotation counter 13, respectively. The sunroof lid 50 is tilted downwardly.

When the sunroof lid 50 is downwardly driven by the forward rotation of the armature shaft 71a of the electric motor 71 and the output shaft rotation signal of the Hall IC 6 becomes to the high level (H) at time t13, the control proceeds to the step 226 through the step 223.

Determination is done at the step 226 as to whether the output shaft rotation counter 13 counts the pulses of number "Na" or not, the control proceeds to the step 225 because the output shaft rotation counter 13 does not count the pulses of number "Na" yet and the electric motor 71 continues the forward rotation of the armature shaft 71a.

If the sunroof lid 50 is further tilted downwardly according to the continuation of the forward rotation of the armature shaft 71a and the output shaft rotation signal of the Hall IC 6 becomes to the high level (H), the control proceeds to the step 226 from the step 223.

When the output shaft rotation counter 13 completes to count the pulses of number "Na" at time t14, the control proceeds to the step 227 from the step 226.

Determination is done at the step 227 as to whether or not the offset position counter 12 counts the pulses of number "na". The control proceeds to the step 225 from the step 227 while the offset position counter 12 is counting the pulses of number "na". When the offset position counter 12 finishes to count the pulses of number "na" from the t14 till time t15, the control proceeds to step 233 from the step 227. The sunroof lid 50 is previously so designed as to arrive in the full-closed position at the time of finishing the count of the pulses of number "na" by the offset position counter 12.

Subsequently, "to reset the switch-off flag [SWOFF FG]" is executed at the step 233, to set the full-closed position data CLOSE in the roof position counter 14" is executed at step 234, and "to reset the full-closed position recognition flag [CLSCHK FG]" is further executed at step 235. Furthermore, the control proceeds to step 236 and "finish the initial action" is set at the step 236.

According to the aforementioned routine, the resetting of the roof position counter 14 and the sunroof lid 50 is carried out. The control returns to the step 100 in the mainroutine after finishing the initial mode subroutine.

As mentioned above, this invention is possible to provide the sunroof controlling device which is not provided with the position detecting switch composed of the speed decreasing means with some gears and the switching mechanism. Furthermore, even if the error is caused in the count value of the roof position counter, it is possible to securely reset the count value of the position counter in the sunroof controlling device according to this invention.

What is claimed is:

1. A sunroof controlling device for controlling a sunroof of a motor vehicle comprising:
   an actuator provided with an electric motor having an armature shaft, a reduction gear driven by rotation of the armature shaft of said electric motor and an output shaft combined with said reduction gear;
   a switch for generating a command signal to drive the electric motor of said actuator; and
   a control unit electrically connected to said switch and said electric motor of the actuator, and including an armature shaft rotation signal generating means for generating an armature shaft rotation signal according to rotation of said armature shaft of the electric motor, an output shaft rotation signal generating means for generating an output shaft rotation signal according to rotation of said output shaft of the actuator, and a counting means for counting the armature shaft rotation signal generated from said armature shaft rotation signal generating means and the output shaft rotation signal generated from said output shaft rotation signal generating means;

wherein said control unit starts current supply to said electric motor of the actuator in response to the command signal supplied from said switch, and interrupts the current supply to the electric motor of said actuator when the count value of said counting means amounts to predetermined value, wherein said counting means starts counting pulses of the armature shaft rotation signal generated from said armature shaft rotation signal generating means when a pulse edge of the output shaft rotation signal generated from said output shaft rotation signal generating means is detected.

2. A sunroof controlling device for controlling a sunroof of a motor vehicle comprising:

an actuator provided with an electric motor having an armature shaft, a reduction gear driven by rotation of the armature shaft of said electric motor and an output shaft combined with said reduction gear;

a switch for generating a command signal to drive the electric motor of said actuator; and a control unit electrically connected to said switch and said electric motor of the actuator, and including a first rotation signal generating means for generating a first rotation signal according to rotation of said armature shaft of the electric motor, a second rotation signal generating means for generating a second rotation signal with phase difference from said first rotation signal according to rotation of said armature shaft of the electric motor, an output shaft rotation signal generating means for generating an output shaft rotation signal according to rotation of said output shaft of the actuator, and a counting means for counting the first and second rotation signals generated from said first and second rotation signal generating means and the output shaft rotation signal generated from said output shaft rotation signal generating means;

wherein said control unit starts current supply to said electric motor of the actuator in response to the command signal supplied from said switch, and interrupts the current supply to the electric motor of said actuator when the count value of said counting means amounts to predetermined value, wherein said counting means starts counting pulses of the first and second rotation signals generated from said first and second rotation signal generating means when a pulse edge of the output shaft rotation signal generated from said output shift rotation signal generating means is detected.

3. A sunroof controlling device for controlling a sunroof of a motor vehicle comprising:

a first switch for generating a slide open-tilt down signal;

a second switch for generating a slide close-tilt up signal;

an actuator provided with an electric motor having an armature shaft, a reduction gear driven by rotation of the armature shaft of said electric motor and an output shaft combined with said reduction gear for driving a sunroof lid of the motor vehicle in a slide-opening direction, a slide-closing direction, a tilt-downward direction or a tilt-upward direction; and a control unit electrically connected to said first and second switches and said electric motor of the actuator, and including a first rotation signal generating means for generating a first rotation signal according to rotation of said armature shaft of the electric motor, a second rotation signal generating means for generating a second rotation signal with phase difference from said first rotation signal according to rotation of said armature shaft of the electric motor, an output shaft rotation signal generating means for generating an output shaft rotation signal according to rotation of said output shaft of the actuator, and a counting means for counting the first and second rotation signals generated from said fast and second rotation signal generating means and the output shaft rotation signal generated from said output shaft rotation signal generating means;

wherein said control unit starts current supply to said electric motor of the actuator in response to the slid open-tilt down signal or the slide close-tilt up signal supplied from said first or second switch, and interrupts the current supply to the electric motor of said actuator when the count value of said counting means amounts to predetermined value, wherein said counting means starts counting pulses of the first and second rotation signals generated form said first and second rotation signal generating means when a pulse edge of the output shaft rotation signal generated from said output shaft rotation signal generating means, after the slide open-tilt down signal is supplied from said first switch in an initial mode, is detected.

4. A sunroof controlling device for controlling a sunroof lid of a motor vehicle comprising:

a first switch for generating a slide open-tilt down signal;

a second switch for generating a slide close-tilt up signal;

an actuator provided with an electric motor having an armature shaft, a reduction gear driven by rotation of the armature shaft of said electric motor and an output shaft combined with said reduction gear for driving a sunroof lid of the motor vehicle in a slide-opening direction, a slide-closing direction, a tilt-downward direction or a tilt-upward direction; and a control unit electrically connected to said first and second switches and said electric motor of the actuator, and including a first rotation signal generating means for generating a first rotation signal according to rotation of said armature shaft of the electric motor, a second rotation signal generating means for generating a second rotation signal with phase difference from said first rotation signal according to rotation of said armature shaft of the electric motor, an output shaft rotation signal generating means for generating an output shaft rotation signal according to rotation of said output shaft of the actuator, a counting means for counting the first and second rotation signals generated from said first and second rotation signal generating means and the output shaft rotation signal generated from said output shaft rotation signal generating means, and a roof position counting means for counting the first and second rotation signal generated from said first and second rotation signal generating means and recognizing a position of the sunroof lid;

wherein said control unit starts current supply to said electric motor of the actuator in response to the slid open-tilt down signal or the slide close-tilt up signal supplied from said first or second switch, and resets count value of said roof position counting means to initial value when the count value of said counting means amounts to predetermined value, wherein said counting means starts counting pulses of the first and second rotation signals generated form said first and second rotation signal generating means when a pulse edge of the output shaft rotation signal generated from said output shaft rotation signal generating means, after the slide open-tilt down signal is supplied from said first switch in an initial mode, is detected.

5. A sunroof controlling device for controlling a sunroof lid of a motor vehicle comprising:

a first switch for generating a slide open-tilt down signal;

a second switch for generating a slide close-tilt up signal;

an actuator provided with an electric motor having an armature shaft, a reduction gear driven by rotation of the armature shaft of said electric motor and an output shaft combined with said reduction gear for driving a sunroof lid of the motor vehicle in a slide-opening direction, a slide-closing direction, a tilt-downward direction or a tilt-upward direction; and a control unit electrically connected to said first and second switches and said electric motor of the actuator, and including a first rotation signal generating means for generating a first rotation signal according to rotation of said armature shaft of the electric motor, a second rotation signal generating means for generating a second rotation signal with phase difference from said first rotation signal according to rotation of said armature shaft of the electric motor, an output shaft rotation signal generating means for generating an output shaft rotation signal according to rotation of said output shaft of the actuator, a first counting means for counting the first and second rotation signals generated from said first and second rotation signal generating means a second counting means for counting the output shaft rotation signal generated from said output shaft rotation signal generating means, and a roof position counting means for counting the first and second rotation signal generated from said first and second rotation signal generating means and recognizing a position of the sunroof lid;

wherein said control unit starts current supply to said electric motor of the actuator in response to the slid open-tilt down signal or the slide close-tilt up signal supplied from said first or second switch, and interrupts the current supply to the electric motor of said actuator and resets count value of said roof position counting means to initial value if the count value of said first counting means amounts to a first predetermined value.

wherein said first counting means starts counting pulses of the first and second rotation signals generated from said first and second rotation signal generating means when a pulse edge of the output shaft rotation signal generated from said output shaft rotation generating means, at the time when said second counting means counts pulses of the output shaft rotation signal generated form said output shaft rotation signal generating means up to a second predetermined value after the slide open-tilt down signal is supplied from said first switch in an initial mode, is detected.

* * * * *